Feb. 17, 1931.  H. N. HERRICK  1,792,639
METHOD OF AND APPARATUS FOR DETERMINING THE DIRECTION
OF THE DIP AND STRIKE OF THE EARTH'S SUBSTRATA
Original Filed May 14, 1928
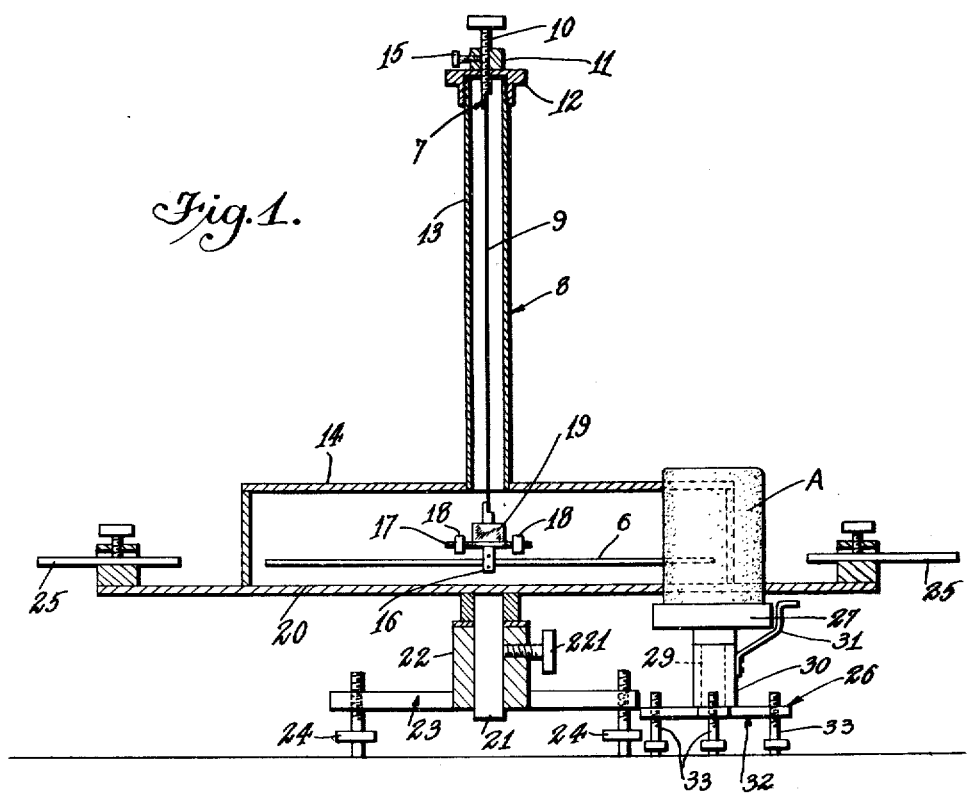
Fig.1.
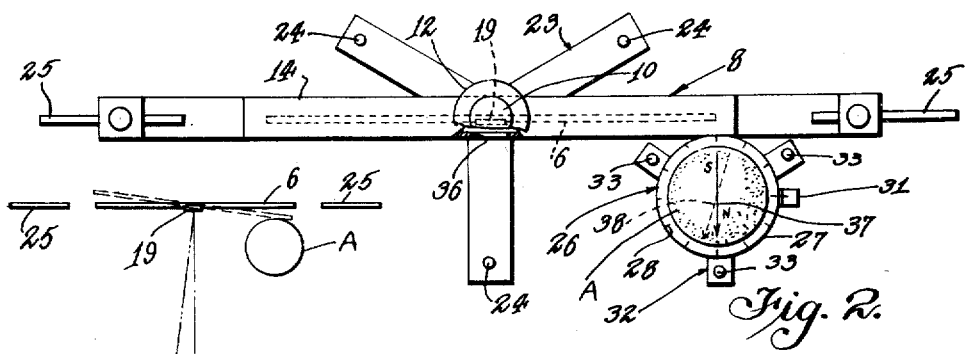
Fig.2.
Fig.3.
Inventor
Henry N. Herrick
By Lyon & Lyon
Attorneys Patented Feb. 17, 1931

1,792,639

UNITED STATES PATENT OFFICE

HENRY N. HERRICK, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

METHOD OF AND APPARATUS FOR DETERMINING THE DIRECTION OF THE DIP AND STRIKE OF THE EARTH'S SUBSTRATA

Application filed May 14, 1928, Serial No. 277,729. Renewed March 31, 1930.

This invention relates to a method and apparatus for determining the direction of the dip and strike of the earth's substrata. More particularly, the invention relates to the determination of the magnetic properties of a sample taken from the strata of which the direction of the dip and strike are to be ascertained. The invention is useful in exploring for oil or minerals.
It has long been customary to obtain samples from the earth's substrata by employing diamond core drills or core drills of other types, either rotary or percussive. Under the old methods of determining the direction of the dip and strike of the earth's substrata, it has been customary to make a plurality of borings at a distance from one another. From this it will be readily seen, that, if the samples must be taken at a relatively great depth in the earth, as is usually requisite in exploring for oil, the cost of determining the dip and strike of any given substratum will be enormous.
Some attempts have heretofore been made to determine the dip and strike of a given substratum by employing samples cut from a single bore hole. The method employed in such instance is to place a magnetic needle in the core barrel and then to lock the needle in the position it assumes at the moment the core is severed from the material that surrounds it in the formation.
The core barrel is then elevated to the surface and the north position of the magnetic needle is noted and marked on the core. This prior known method is not as accurate or reliable as is desirable, because of the mechanical and physical difficulties attendant upon the operation of the delicate and complicated mechanism that is required, and because of the severe conditions attending practical oil well work.
An important object of the present invention is simplicity and reliability of methods and apparatus for determining the dip and strike of the earth's substrata from a single bore hole.
Another object is to provide a method and apparatus whereby the core or sample may be obtained by employment of any suitable well known core drill or other tool, thus making unnecessary the use of delicate or complicated mechanism in connection with the core cutting operation.
Another object is to provide a method and apparatus by which many, if not all, samples can be oriented, after they have been removed from the bore hole, to correspond with their original positions in the formation from which they have been taken.
Another object is to determine the dip and strike of a substratum by examination of the magnetic properties of a sample cut from the substratum.
Other objects and advantages will appear in the subjoined detailed description.
It has been pointed out by previous investigators that many mineral crystals in the igneous and plutonic rocks have a slight permanent magnetism induced in them by the earth's magnetic field as the rocks were cooled down past the "Curie point", or, in other words, cooled through the temperature at which non-magnetic substances assume magnetic properties. It has been stated, also, by certain prior investigators that the position of the magnetic north pole in various geologic ages can be determined by observing the polarity of such rocks.
It would appear that, as the older rocks are weathered and eroded away, the crystals composing them are freed and carried away by the water and ultimately deposited in sedimentary beds. Since the tiny crystals will each have a weak magnetic polarity corresponding to the polarity of the rock from which the crystals have been eroded, there will be a small directive force tending to cause the crystals to lie so that their poles will be in the magnetic meridian. Thus, when such crystals are carried into bodies of water and laid down as sedimentary strata, the settling particles, especially the finer ones comprising clays and shales, tend to come to rest, on the average, with their magnetic axes in the direction of the earth's magnetic meridian. Very fine particles, since they have an almost frictionless suspension in water and settle very slowly, have ample opportunity to orient, in settling, so that their magnetic axes will lie in the direction of the earth's magnetic meridian. Although the settling of many such crystals, in the manner just mentioned, may have been interfered with by other particles, no doubt the major portion of the crystals arranged themselves with their axes in the magnetic meridian, thus giving a distinct magnetic polarity to the sedimentary rocks composed of said crystals.

In order to determine the original orientation of a core or other sample taken from the earth's structure, it is necessary to provide an instrument that is sufficiently sensitive to locate the magnetic north and south poles of the core. While some substances, such as limestone and diatomaceous earth do not in themselves have magnetic properties strong enough for my purpose, I have found that cores containing such non-magnetic substances usually have in them impurities, such as iron, which have strong magnetic properties and which, accordingly, give to said cores a definite measurable polarity. Having determined the magnetic north and south poles of the sample, the next step is to determine, if possible, the variations between the positions of the magnetic pole at the present time and at the geologic period when the material comprising the sample was laid down. This can usually be accomplished by locating an outcrop of the same formation that is being examined and comparing the north and south meridian of the outcrops with the north and south meridian of the earth. If no outcrop of the formation under examination can be found, the magnetic variation can not be determined but, in any event, the difference between the meridians of the sample and earth, at the time of sampling, will not be over 15°, since the magnetic north pole of the earth reciprocates only through a 30° arc in about 400 years.

While many different devices may be used to determine the polarity of a core or other sample taken from the earth's structure, I have found that a magnetic needle will give satisfactory results when testing most cores. I prefer to employ a powerful permanent magnet placed in a weak magnetic field. By the expression "weak magnetic field" I mean a magnetic field weaker than that of the earth, as will be more fully explained hereinafter. When the sample is placed near one end of the magnetic needle and then rotated through a complete circle, the magnetic needle will be alternately attracted and repelled.

By making marks on the sample at the points where the maximum attraction and repulsion occur, the north and south magnetic poles of the sample will be indicated by said marks.

The accompanying drawings illustrate the preferred embodiment of the invention.

Figure 1 is a view, mainly in vertical mid-section, of an apparatus constructed in accordance with the provisions of this invention, a sample being indicated in position on the core support.

Figure 2 is a plan view, partly in section, of the apparatus shown in Figure 1.

Figure 3 is a diagrammatic plan view of the apparatus together with the device whereby amplification of the needle deflection is obtained.

In the drawings, there is a magnetic needle 6 suspended horizontally by a suitable suspension means 7 in a case which is indicated in general by the character 8. The case 8 is preferably constructed of a non-magnetic material, such as brass, so as to not interfere with the lines of force of the earth's magnetic field. Although any suitable suspension means may be employed, I prefer to use a fine thread or ribbon, such as a phosphor-bronze ribbon 9 secured at its upper end to an adjusting screw 10 which is threaded through a nut 11 seated on a cap 12.

The cap 12 is screwed onto the upper end of a tube 13 which, in part, constitutes the case 8. The tube 13 constitutes a standard that projects vertically from a larger lower portion 14 of the case. The magnetic needle 6 may be raised or lowered by turning the screw 10 thus to vertically adjust said needle and, when the desired adjustment has been made, said screw 10 may be locked in the adjusted position by a set screw 15 which is screwed into the nut 11 and has its inner end bearing against the screw 10, at right angles to said screw 10.

To the lower end of the ribbon 9 is secured a metallic member or ribbon 16 to which the magnetic needle 6 is secured at approximately its center of gravity. The member 16 carries a balance arm 17 which is soldered or otherwise secured to the member 16 parallel with the needle 6. Adjustably mounted on the arm 16 are weights 18, which, in this instance, are threaded onto said arm so that they can be screwed in and out. To the member 16 is secured, by glue or other suitable means, a mirror 19. The needle 6 is positioned inside of the case portion 14 and the ribbon 9 extends upwardly through the tube 13. Although it is not necessary that the case 8 be perfectly level, it is advisable that a leveling support for said case be provided in order to insure that neither the ribbon 9 nor the needle 6 engages and binds on the case and, accordingly, the floor 20 of the case is provided with a downwardly projecting stud 21 which projects into a socket 22 carried by a tripod or other suitable support 23 which has adjustable feet 24, said feet comprising screws which are threaded into the legs of the tripod. A screw 221 in the socket 22 can be set up tight against the stud 21 to prevent rotation of said stud in said socket.

I have found it advisable to decrease the intensity of the earth's magnetic field, in the area surrounding the needle, nearly to zero so that a very slight magnetic force will attract or repel the needle. For this reason, I preferably place permanent magnets 25 at opposite sides of the case portion 14 substantially in alignment with the needle 6. The magnets 25 are positioned so that the poles nearest the needle correspond with the poles of the needle.

A core or other sample that is to be examined is indicated at A and is mounted on a suitable support which is indicated in general by the character 26 and which is constructed as follows: The base of the sample A fits into a collar 27 which has its upper face graduated into 360° as indicated at 28. The collar 27 is rotatably mounted, being provided with a downwardly projecting stud 29 which is rotatably mounted in a bearing 30. To the bearing 30 is secured a stationary pointer 31 which extends upwardly close to the graduated periphery of the collar 27. The bearing 30 is mounted on a tripod, or other suitable support, 32 which is provided with adjustable feet 33 screwed into the legs of the tripod, thus enabling the sample A to be leveled with respect to the needle 6.

To determine the direction of the dip and strike of the earth's substrata, from which the sample A has been taken, the case 8 is set up with the needle 6 extending in the direction of the earth's magnetic meridian. Then the sample A is mounted in position and the core support is moved to a position that will place the sample close to one end of the magnetic needle. The collar 27 is turned so as to set the zero degree mark on the collar in registration with the pointer 31.

The deflection of the needle, being very slight, the reading of the deflection may be suitably amplified by means of the mirror 19. The deflection of the needle may be recorded in various ways. For example, a telescope or other sighting device 34 is mounted so that it can be turned in horizontal and vertical paths. Such mounting is well understood in the art relating to telescopes and, accordingly, it will not be necessary to illustrate and describe the same herein. Beneath the level of the telescope is mounted a scale 35 in such position that the reflection of said scale in the mirror is visible through the telescope. The scale may be graduated into any suitable size and number of divisions and the telescope and scale may be placed at any desired distance from the mirror 4, the greater the distance the greater the amplification of the needle's deflection. The telescope and scale remain fixed during the entire examination of the sample and only the core and magnetic needle are moved. In order that the mirror may be viewed, the case portion 14 is provided in one side thereof with a window 36.

The next operation is to rotate the sample and this is effected by turning the collar 27. The sample is rotated in a series of successive steps of predetermined length, for example, through steps of 30° each. The length of the steps is indicated by registration of the pointer 31 with certain ones of the graduation marks 28. After each rotary motion of the sample, the amount of deflection of the needle is observed and duly noted. After the sample has been rotated through 360° the points are marked on the sample at which maximum attraction and repulsion of the needle is noted and a line 37 is placed on the upper end of the sample across the diameter thereof connecting said points, said line 37 indicating the magnetic axis of the sample.

When the sample is placed near the south pole of the magnetic needle the point on the sample having a maximum repulsion effect on the needle will be the south pole of the sample and the point on the sample having maximum attraction on the south pole of the needle will be the north pole of the sample. The poles will be marked on the sample, as, for example, by employing the letters $s$ and $n$.

Then, if it is possible to obtain a sample of the same strata from an outcrop thereof, the magnetic variation of the earth's field at the time the sub-stratum sample was laid down is determined as hereinbefore described and then the magnetic axis 37 of the sample A will be corrected so that said axis will correspond with the true magnetic meridian at the time the sedimentary deposition of the matter in the sample A took place. The corrected axis is indicated by the dotted line 38 in Figure 2. The sample A is then examined and the direction of the dip and strike of the material therein is noted with respect to the true meridian 38.

It will be seen that the apparatus for determining the magnetic polarity of cores or other samples taken from the earth's structure may be variously constructed. The apparatus described above is suitable for use where there are no strong electrical fields which would tend to disturb the magnetic field of the earth. I have found, for example, that this particular apparatus does not render reliable results if used within three miles of a direct current power circuit unless a special means is employed to shield the instrument against current. An effective method of shielding the instrument is to surround it on all sides with a casing of iron, or other material, of high magnetic permeability. Good shielding results against direct current can be obtained by placing the instrument in an iron building which has an iron floor in which case a weak directive field is produced inside of the iron field by auxiliary magnets.

Instead of employing the telescope in recording the deflection of the magnetic needle, a fixed source of light, such as a lamp, can be placed so that the light will be reflected from the mirror to the scale 35. The movement of the light along the scale would indicate the amount of deflection of the magnetic needle.

I claim:

1. The method described, consisting in cutting a sample from the earth's substrata, determining the magnetic polarity of said sample, orienting the sample to correspond with its original position in the earth, and measuring the direction of the dip and strike of the material in the core.

2. The method described, consisting in cutting a sample from the earth's substrata, determining the magnetic polarity of the sample, orienting the sample to correspond with its original position in the earth, and measuring the direction of the dip and strike of the material of the core while it is in this position.

3. The method described, consisting in cutting a sample from the earth's substrata, determining the magnetic polarity of the sample, determining from an outcrop corresponding to said substrata the variation in positions between the earth's north magnetic poles at the present time and at the prior geologic period when said substrata was laid down, orienting the sample to correspond with its original position in the earth and measuring the direction of the dip and strike of the material of the sample while it is in this position.

Signed at San Francisco, California, this 7th day of May, 1928.

HENRY N. HERRICK.

the mirror to the scale 35. The movement of the light along the scale would indicate the amount of deflection of the magnetic needle.

I claim:

1. The method described, consisting in cutting a sample from the earth's substrata, determining the magnetic polarity of said sample, orienting the sample to correspond with its original position in the earth, and measuring the direction of the dip and strike of the material in the core.

2. The method described, consisting in cutting a sample from the earth's substrata, determining the magnetic polarity of the sample, orienting the sample to correspond with its original position in the earth, and measuring the direction of the dip and strike of the material of the core while it is in this position.

3. The method described, consisting in cutting a sample from the earth's substrata, determining the magnetic polarity of the sample, determining from an outcrop corresponding to said substrata the variation in positions between the earth's north magnetic poles at the present time and at the prior geologic period when said substrata was laid down, orienting the sample to correspond with its original position in the earth and measuring the direction of the dip and strike of the material of the sample while it is in this position.

Signed at San Francisco, California, this 7th day of May, 1928.

HENRY N. HERRICK.

---

CERTIFICATE OF CORRECTION.

Patent No. 1,792,639.   Granted February 17, 1931, to

HENRY N. HERRICK.

It is hereby certified that error appears in the printed specification of the above numbered patent requiring correction as follows: Page 4, lines 12 and 19, claims 1 and 2, respectively, for the word "core" read sample; and that the said Letters Patent should be read with these corrections therein that the same may conform to the record of the case in the Patent Office.

Signed and sealed this 5th day of May, A. D. 1931.

(Seal)

M. J. Moore,
Acting Commissioner of Patents.

CERTIFICATE OF CORRECTION.

Patent No. 1,792,639. Granted February 17, 1931, to

HENRY N. HERRICK.

It is hereby certified that error appears in the printed specification of the above numbered patent requiring correction as follows: Page 4, lines 12 and 19, claims 1 and 2, respectively, for the word "core" read sample; and that the said Letters Patent should be read with these corrections therein that the same may conform to the record of the case in the Patent Office.

Signed and sealed this 5th day of May, A. D. 1931.

(Seal)

M. J. Moore,
Acting Commissioner of Patents.